United States Patent
Itoh

(10) Patent No.: US 6,521,717 B1
(45) Date of Patent: Feb. 18, 2003

(54) BIODEGRADABLE POLYESTER RESIN COMPOSITION AND ITS USE

(75) Inventor: Hiroshi Itoh, Kobe (JP)

(73) Assignee: Nippon Shokubai Co., Ltd., Osaka (JP)

( * ) Notice: Subject to any disclaimer, the term of this patent is extended or adjusted under 35 U.S.C. 154(b) by 1 day.

(21) Appl. No.: 09/671,723

(22) Filed: Sep. 28, 2000

(30) Foreign Application Priority Data

Oct. 5, 1999 (JP) ............................................. 11-283818

(51) Int. Cl.⁷ .............................................. C08L 67/02
(52) U.S. Cl. ........................ 525/444; 525/411; 525/425; 525/440; 525/938
(58) Field of Search ................................ 525/444, 425, 525/411, 440, 938

(56) References Cited

U.S. PATENT DOCUMENTS

| | | | |
|---|---|---|---|
| 5,324,794 A | 6/1994 | Taka et al. .................... | 525/440 |
| 5,349,028 A | 9/1994 | Takahashi et al. ........... | 525/440 |
| 6,018,004 A | * 1/2000 | Warzelhan ................... | 525/440 |
| 6,297,347 B1 | * 10/2001 | Warzelhan ................... | 528/272 |

FOREIGN PATENT DOCUMENTS

| | | |
|---|---|---|
| DE | 4440837 | 5/1996 |
| EP | 0909789 | 4/1999 |
| FR | 2533493 | 3/1984 |
| JP | 507109 | 10/1993 |
| JP | 170941 | 6/1994 |
| JP | 11517 | 1/1995 |
| JP | 08120165 | 5/1996 |
| JP | 09003180 | 1/1997 |
| JP | 508640 | 8/1998 |
| JP | 508647 | 8/1998 |
| JP | 512006 | 11/1998 |
| JP | 500157 | 1/1999 |
| JP | 500468 | 1/1999 |
| JP | 500762 | 1/1999 |
| WO | 9118036 | 11/1991 |
| WO | 9615173 | 5/1996 |
| WO | 9615174 | 5/1996 |
| WO | 9615176 | 5/1996 |
| WO | 9621689 | 7/1996 |
| WO | 9621692 | 7/1996 |
| WO | 9625446 | 8/1996 |

OTHER PUBLICATIONS

"Transesterification and Ringed Spherulites in Blends of Butylene Terephthalate—caprolactone Copolyester With Poly(–caprolactone)"; Ma et al.; Polymer, vol. 38, No. 5, pp. 1131–1138; 1997.

Kinetic Studies on Transesterification Reactions Between Poly(EthyleneTerephthalate) and Poly(Ethylene Sebacate); Murano et al.; Polymer Journal, vol. 2, No. 1, pp. 8–12, 1971.

* cited by examiner

*Primary Examiner*—Patricia A. Short
(74) *Attorney, Agent, or Firm*—Roylance, Abrams, Berdo & Goodman, L.L.P.

(57) ABSTRACT

The present invention provides a biodegradable polyester resin composition that exhibits a rapid crystallization rate and is excellent in molding processability. This biodegradable polyester resin composition comprises biodegradable polymer (A) and aliphatic polyester (B) wherein the biodegradable polymer (A) contains aromatic dicarboxylic acid as an essential structural unit.

20 Claims, No Drawings

BIODEGRADABLE POLYESTER RESIN COMPOSITION AND ITS USE

BACKGROUND OF THE INVENTION

A. Technical Field

The present invention relates to a biodegradable polyester resin composition and its use. Specifically, the present invention relates to a biodegradable polyester resin composition and its use wherein the biodegradable polyester resin composition exhibits improved molding processability and tearing character.

B. Background Art

It is well-known that a lot of aliphatic and aromatic polyesters are as biodegradable polyesters up to now.

It is acknowledged that the aliphatic polyesters have biodegradability in general. It is proposed in JP-A-11517/1995, JP-A-170941/1994 and so on that the aliphatic polyesters can be utilized for a fiber, a molded product, a sheet and a film by applying a characteristic of the aliphatic polyesters.

On the one hand, the biodegradable aromatic polyesters are disclosed in such as JP-A-507109/1993, JP-A-508640/1998, JP-A-500157/1999.

However, the present inventors found two important problems when studying molding processability of the aliphatic polyesters for some time past. At the first, the aliphatic polyesters are inferior in molding processability because of having a long tack-free time in view of industrial productivity. Namely, there was a problem in injection molding that deformation of the molded products, inferior surface appearance and unrelease from the mold at worst occur because the aliphatic polyesters are not crystallized enough in a mold owing to the aliphatic polyesters having a long tack-free time. In addition, there was a problem in molding a film such as molding an inflationary film that fellow films melt-adhere because of a long tack-free time when winding the molded films extruded from dies.

The inventors diligently studied these problems for some time past. As a result, they obtained some findings and proposed JP-A-120165/1996 as one solution. JP-A-120165/1996 proposed a biodegradable polyester resin composition that exhibited a rapid crystallization rate and was excellent in molding processability. Though the acceleration of the crystallization rate of the polyester resin by this method can be confirmed, it was acknowledged that this method alone was not enough to mold in practice.

Incidentally, the tack-free time referred to in the present invention means a time until that resin in a melting state is cooled and solidified and the surface thereof do not have any adhesion. In addition, a measuring method thereof is described later.

At the second, it was acknowledged that the aliphatic polyesters were inferior in heat resistance and it remained a problem to utilize the aliphatic polyesters as a molded product to be heat-melted and plastic-processed.

Furthermore, it was hoped to improve tearing character when producing films except for the above molding processability. For example, when composting kitchen refuse produced in a food store and a restaurant, there is a problem that: refuse bag made of biodegradable resin was used but the refuse bag was pierced and torn when the kitchen refuse included something sharp such as fish bone.

On the one hand, biodegradable polymer (A) itself containing aromatic dicarboxylic acid as an essential structural unit is already well-known. These already well-known polymers have a short tack-free time and no problem on molding processability practically. However, it was acknowledged that: these already well-known polymers do not have tensile strength enough, and has low biodegradability in soil because the polymer contains a lot of aromatic dicarboxylic acid, especially biodegradability in active sludge that is expected to have biodegradability in river is extremely inferior.

In addition, it was acknowledged that biodegradable polymer (A) is inferior in biodegradability at composing in order to applying in a small composing apparatus that requires a comparatively rapid biodegradable rate. In order to improve biodegradability of biodegradable polymer (A) containing aromatic dicarboxylic acid as an essential structural unit, it is considered to diminish aromatic dicarboxylic acid component. However, in order to be more satisfied with biodegradability, diminishing aromatic dicarboxylic acid component causes a problem to lower melting point, to disorder crystallinity, and to lower heat resistance and molding.

SUMMARY OF THE INVENTION

A. Object of the Invention

Thus, considering the above circumstances, an object of the present invention is to provide a novel and useful biodegradable polyester resin composition and its use wherein the biodegradable polyester resin composition solves the problems of the above conventional aliphatic polyester resin composition, and exhibits a short tack-free time, and is excellent in heat resistance, and exhibits improved molding processability and tearing resistance.

B. Disclosure of the Invention

Considering the present circumstances, the present inventors diligently studied to solve the above-mentioned problems. As a result, they achieved the above object by developing a composition that comprises biodegradable polymer (A) and aliphatic polyester (B) wherein the biodegradable polymer (A) contains aromatic dicarboxylic acid as an essential structural unit.

Accordingly, a biodegradable polyester resin composition, according to the present invention, comprises biodegradable polymer (A) and aliphatic polyester (B) wherein the biodegradable polymer (A) contains aromatic dicarboxylic acid as an essential structural unit.

The reason for coexisting moldability and tearing resistance, and biodegradability in the resin composition of the present invention is considered that component (A) and component (B) form what is called "islands-sea structure" because aliphatic polyester (B) excellent in biodegradability, and biodegradable polymer (A) containing aromatic dicarboxylic acid as an essential structural unit excellent in moldability and tearing resistance are mixed in a fixed ratio into the composition. When molding process and using as a molded product, the composition is excellent in moldability and tearing resistance of component (A). After finishing a mission and when discharging into environment or composting process, component (B) in the composition is biodegraded rapidly. On the one hand, component (A) remains as a fine particle because component (B) vanishes owing that component (B) has biodegradability, and it is considered to biodegrade component (A) in a short time because of enlarging the surface area of component (A).

The tack-free time of the composition is preferably in the range of 3 to 30 seconds, more preferably 5 to 20 seconds.

It is preferable that the molecular-weight-retaining ratio defined in formula (1) shown below is 0.8 or more.

$$\text{Molecular-weight-retaining ratio}=X/Y \qquad (1)$$

wherein: X represents a number-average molecular weight after a heating test in a condition of 150° C. and 4 hours; and Y represents a number-average molecular before the heating test.

A molded product, according to the present invention, is obtained from the biodegradable polyester resin composition including biodegradable polymer (A) and aliphatic polyester (B) wherein the biodegradable polymer (A) contains aromatic dicarboxylic acid as an essential structural unit.

Toughness of the molded product is preferably 49 N/mm$^2$ or more measured in 1,000 mm/minute of testing speed according to plastic tensile test (ASTM-D882-90 (A method)), and more preferably 98 N/mm$^2$ or more.

These and other objects and the advantages of the present invention will be more fully apparent from the following detailed disclosure.

DETAILED DESCRIPTION OF THE INVENTION

Biodegradable polymer (A) containing aromatic dicarboxylic acid as an essential structural unit, used in the present invention, is not especially limited. Examples thereof is a biodegradable polymer containing aromatic dicarboxylic acid as an essential structural unit and having a number-average molecular weight of 5,000 to 100,000, preferably 10,000 to 80,000, more preferably 20,000 to 50,000. Melting point of the polymer is 60 to 200° C., preferably 80 to 160° C., more preferably 95 to 160° C.

In addition, examples for biodegradable polymer (A) containing aromatic dicarboxylic acid as an essential structural unit include polyester, polyester ether, polyester amide, polyether ester amide.

Biodegradability or ability for biodegradation referred in the present invention is defined as follow. Namely biodegradable polymer (A) or aliphatic polyester (B) or the biodegradable polyester resin composition exhibits a biodegradation percentage of 60% or more obtained by the experiment according to the experimental method of either ISO14851, ISO14852, ISO14855 or OECD Guidelines for Testing of Chemicals (301C, Modified MITI Test).

Examples of the biodegradable polyester (A) containing aromatic dicarboxylic acid as an essential structural unit can be obtained by use of: mainly one or both of terephthalic acid or ester thereof and adipic acid or ester thereof; and glycol having two or more carbon atoms, a compound having at least three groups that can form ester, a sulfonate compound, a hydroxyl carboxylic acid, a diisocyanate, a bisoxazoline or a divinyl ether, according to well-known methods (for example, JP-A-507109/1993, JP-A-508640/1998, JP-A-500157/1999).

In addition, the biodegradable polymer (A) may also be prepared by synthesizing a widely used saturated polyester and a biodegradable polyester separately and then melt-kneading them together in conventional ways (for example, JP-A-3180/1997), thereby carrying out transesterification therebetween. Examples of the widely used saturated polyester include polyethylene terephthalate, polybutylene terephthalate, poly(1,4-cyclohexanedimethylene terephthalate), poly(1,4-cyclohexanedimethylene ethylene terephthalate), poly(1,4-cyclohexanedimethylene terephthalate isophthalate), poly(ethylene naphthalene dicarboxylate). Examples of biodegradable polyester include: poly(α-hydroxyl acids) such as polyethylene succinate, polybutylene succinate, polybutylene succinate adipate, polyhexamethylene succinate, polyethylene adipate, polyhexamethylene adipate, polybutylene adipate, polyethylene oxalate, polybutylene oxalate, polyneopentyl oxalate, polyethylene sebacate, polybutylene sebacate, polyhexamethylene sebacate, polyglycolic acid and polylactic acid or copolymers thereof; poly(ω-hydroxyalkanoate) such as poly(ε-caprolactone) and poly(β-propiolactone); poly(β-hydroxyalkanoate) such as poly(3-hydroxybutyrate), poly(3-hydroxyvalerate), poly(3-hydroxycaproate), poly(3-hydroxyheptanoate), poly(3-hydroxyoctanoate), and poly(4-hydroxybutyrate). The number-average molecular weight of the biodegradable polyester is in the range of 5,000 to 200,000, preferably 10,000 to 100,000, more preferably 30,000 to 80,000, most preferably 50,000 to 80,000.

Examples of biodegradable polyester ether containing aromatic dicarboxylic acid as an essential structural unit can be obtained by use of: mainly one or both of terephthalic acid or ester thereof and adipic acid or ester thereof; and glycol having two or more carbon atoms, polyether polyol, a compound having at least three groups that can form ester, a sulfonate compound, a hydroxyl carboxylic acid, a diisocyanate, a bisoxazoline or a divinyl ether, according to well-known methods (for example, JP-A-508647/1998, JP-A-500468/1999).

Examples of biodegradable polyester amide containing aromatic dicarboxylic acid as an essential structural unit can be obtained by use of: mainly one or both of terephthalic acid or ester thereof and adipic acid or ester thereof; and glycol having two or more carbon atoms, amino-$C_2$–$C_{12}$-alkanol or amino-$C_5$–$C_{10}$-cycloalkanol, diamino-$C_1$–$C_8$-alkane, a compound having at least three groups that can form ester, a sulfonate compound, hydroxyl carboxylic acid, natural amino acid, polyamide, a diisocyanate, a bisoxazoline or a divinyl ether, according to well-known methods (for example, JP-A-512006/1998, JP-A-500762/1999).

Terephthalic acid or partial ester thereof can be replaced with at least one member selected from the group consisting of isophthalic acid, phthalic acid, 2,6-naphthalene dicarboxylic acid, preferably isophthalic acid; and ester thereof such as di-$C_1$–$C_6$-alkyl ester, preferably dimethyl ester or mixture thereof.

Adipic acid or partial ester thereof can be replaced with at least one member selected from the group consisting of other aliphatic $C_4$–$C_{10}$- or alicyclic $C_5$–$C_{10}$-dicarboxylic acid, such as succinic acid, glutaric acid, pimelic acid, suberic acid, azelaic acid, sebacic acid; and ester derivatives thereof such as di-$C_1$–$C_6$-alkyl esters or acid anhydrides thereof such as succinic anhydride, mixture thereof, preferably succinic acid, succinic anhydride, sebacic acid and di-$C_1$–$C_6$-alkyl esters such as dimethyl ester thereof, diethyl ester thereof, di-n-propyl ester thereof, diisobutyl ester thereof, di-n-pentyl ester thereof, dineopentyl ester thereof, di-n-hexyl ester thereof, especially dimethyl succinate.

Examples of glycol having two or more carbon atoms include $C_2$–$C_6$-alkanediol and $C_5$–$C_{10}$-cycloalkanediol such as ethylene glycol, 1,2-propanediol, 1,3-propanediol, 1,2-butanediol, 1,4-butanediol, 1,5-pentanediol, 1,6-hexanediol, especially selected from the group consisting of ethylene glycol, 1,3-propanediol, 1,4-butanediol, cyclopentanediol, cyclohexanediol, 1,2-cyclohexanedimethanol, 1,4-cyclohexanedimethanol and mixture thereof.

Examples of polyether polyol include diethylene glycol, triethylene glycol, polyethylene glycol, polypropylene glycol, polytetramethylene glycol and copolymer thereof, preferably diethylene glycol, triethylene glycol and polyethylene glycol. The number-average molecular weight of the polyether polyol is in the range of 250 to 8,000, preferably 600 to 3,000.

A compound having at least three groups that can form ester is selected from the group consisting of tartaric acid, citric acid, maleic acid, trimethylolpropane, trimethylolethane, pentaerythritol, polyether triol, glycerol, trimesic acid, trimellitic acid or anhydride thereof, pyromellitic acid or dianhydride thereof, hydroxy isophthalic acid, and mixture thereof.

Examples of a sulfonate compound include alkali, alkali earth metal salt or derivative capable to form ester of dicarboxylic acid including a sulfonate group, preferably alkali metal salt of 5-sulfoisophthalic acid or mixture thereof, especially sodium salt thereof.

Examples of hydroxyl carboxylic acid include glycol acid, D-, L-, or D,L-lactic acid, 6-hydroxyhexanoic acid, cyclic derivative thereof such as glycolide (1,4-dioxane-2, 5-dione), D- or L-dilactide (3,6-dimethyl-1,4-dioxane-2,5-dione), p-hydroxybenzoic acid, oligomer or polymer thereof such as poly(3-hydroxybutyric acid), poly(hydroxyvaleric acid), polylactide and poly(3-hydroxybutyric acid) and poly (hydroxyvaleric acid). More preferably, low-molecular cyclic derivative thereof can be used for production of polyester.

Examples of natural amino acid include glycine, aspartic acid, glutamic acid, alanine, valine, leucine, isoleucine, tryptophane, phenylalanine, oligomer and polymer thereof such as poly aspartic acid amide and polyglutamic acid imide, preferably glycine.

As polyamide, condensed polymerization products between dicarboxylic acid having 4 to 6 carbon atoms and diamine having 4 to 10 carbon atoms such as tetramethylenediamine, pentamethylenediamine, hexamethylenediamine, heptamethylenediamine, octamethylenediamine, nonamethylenediamine and decamethylenediamine are used. Among these polyamides, polyamide-46, polyamide-66 and polyamide-610 are preferable.

When producing biodegradable polymer (A), a catalyst conventionally used for producing polyester or polyamide is used. Examples of this catalyst include metal such as lithium, sodium, potassium, cesium, magnesium, calcium, barium, strontium, zinc, aluminum, titanium, cobalt, germanium, tin, antimony, cadmium, manganese, iron, zirconium, vanadium, yttrium, lanthanum and selenium; an organometallic compound thereof; organic acid salt thereof; metal alkoxide thereof; metal oxide thereof, preferably organic acid salt thereof, metal oxide thereof and acetylacetonate thereof, most preferably calcium acetate, dibutyltin oxide, tetrabutyl titanate, germanium dioxide and antimony trioxide. These catalysts can be used either alone respectively or in combinations with each other.

Biodegradable polymer (A) obtained like this may be further reacted with diisocyanate, bisoxazoline or divinyl ether.

A diisocyanate selected from the group consisting of tolylene-2,4-diisocyanate, tolylene-2,6-diisocyanate, 4,4'- and 2,4'-diphenylmethane diisocyanate, naphthalene-1,5-diisocyanate, xylylene diisocyanate, hexylmethylene diisocyanate, isophorone diisocyanate and bis(4-isocyanatocyclohexane), preferably hexylmethylene diisocyanate can be used. In principle, it is possible to use isocyanurate including three or more functional groups and/or isocyanurate that includes three functional group and may include biuret group, or to replace a diisocyanate compound with tri- or polyisocyanate partially.

Examples of bisoxazoline include 2,2'-bis-(2-oxazoline), 2,2'-methylene-bis-(2-oxazoline), 2,2'-ethylene-bis-(2-oxazoline), 2,2'-trimethylene-bis-(2-oxazoline), 2,2'-tetramethylene-bis-(2-oxazoline), 2,2'-hexamethylene-bis-(2-oxazoline), 2,2'-octamethylene-bis-(2-oxazoline), 2,2'-ethylene-bis-(4,4'-dimethyl-2-oxazoline), 2,2'-p-phenylene-bis-(2-oxazoline), 2,2'-m-phenylene-bis-(2-oxazoline), 2,2'-m-phenylene-bis-(4,4'-dimethyl-2-oxazoline), bis-(2oxazonylcyclohexane) sulfide and bis-(2-oxazolinylnorbornane) sulfide. These can be used either alone respectively or in combinations with each other.

Divinyl ether can be selected from the group consisting of 1,4-butanediol divinyl ether, 1,6-hexanediol divinyl ether and 1,4-cyclohexanedimethanol divinyl ether.

The aliphatic polyester (B), used in the present invention, is not especially limited. Examples thereof is a aliphatic polyester having a number-average molecular weight of 10,000 to 100,000, preferably 25,000 to 100,000, more preferably 40,000 to 100,000, still more preferably 50,000 to 100,000. It is preferable that the aliphatic polyester (B) is a polyester obtained from aliphatic dicarboxylic acid component having 2 to 6 carbon atoms and aliphatic glycol component having 2 to 4 carbon atoms.

In addition, the above aliphatic polyester (B) can be obtained by methods such as i) condensed polymerization of polybasic acid (or ester thereof) and glycol, ii) condensed polymerization of hydroxycarboxylic acid (or ester thereof), iii) ring-opening polymerization of cyclic acid anhydride and cyclic ether and iv) ring-opening polymerization of cyclic ester.

Examples of polybasic acid used in method i) include succinic acid, adipic acid, suberic acid, sebacic acid, azelaic acid, decane dicarboxylic acid, octadecane dicarboxylic acid, dimer acid and ester thereof. Examples of glycol include ethylene glycol, propylene glycol, 1,3-propanediol, 1,4-butanediol, neopentyl glycol, 1,5-pentanediol, 1,6-hexanediol and decamethylene glycol. In addition, as a partial glycol component, it is possible to use polyoxyalkylene glycol such as polyoxyethylene glycol, polyoxypropylene glycol, polyoxytetramethylene glycol and copolymer thereof. Among these, combinations of succinic acid and ethylene glycol and/or of succinic acid and 1,4-butanediol are preferable in view of meting point of obtained polyester, biodegradability and economical reason.

Examples of hydroxycarboxylic acid used in method ii) include glycol acid, 3-hydoxypropionate, 3-hydroxy-2,2-dimethylpropionic acid, 3-hydroxy-3-methyl-butyric acid, 4-hydroxybutyric acid, 5-hydroxyvaleric acid, 3-hydroxybutyric acid, 3-hydroxyvaleric acid, 4-hydroxyvaleric acid, 6-hydroxycaproic acid, citric acid, malic acid and ester thereof. The condensed polymerization can be performed by conventional transesterification and/or esterification.

Examples of cyclic acid anhydride used in method iii) include succinic anhydride, maleic anhydride, itaconic anhydride, glutaric anhydride, adipic anhydride and citraconic anhydride. Examples of cyclic ether used in method iii) include ethylene oxide, propylene oxide, cyclohexene oxide, styrene oxide, epichlorohydrin, allyl glycidyl ether, phenyl glycidyl ether, tetrahydrofuran, oxepane and 1,3-dioxolane. Among these, combination of succinic acid anhydride and ethylene oxide is preferable in view of meting point of obtained polyester, biodegradability and economical reason. The polymerization catalyst is not especially limited, but catalysts conventionally used for ring-opening polymerization of polyesters can be used. Examples thereof include metal oxide such as tetramethoxy zirconium, tetra-iso-propoxy zirconium, tetra-iso-butoxy zirconium, tetra-n-butoxy zirconium, tetra-t-butoxy zirconium, triethoxy aluminum, tri-n-propoxy aluminum, tri-iso-propoxy aluminum, tri-n-butoxy aluminum, tri-iso-butoxy aluminum, tri-sec-butoxy aluminum, mono-sec-butoxy-di-iso-propoxy aluminum, ethyl acetoacetate aluminum diisopropylate, aluminum tris(ethyl acetoacetate), tetraethoxy titanium, tetra-iso-propoxy titanium, tetra-n-propoxy titanium, tetra-n-butoxy titanium, tetra-sec-butoxy titanium, tetra-t-butoxy titanium, tri-iso-propoxy gallium, tri-iso-propoxy antimony, tri-iso-butoxy antimony, trimethoxy boron, triethoxy boron, tri-iso-propoxy boron, tri-n-propoxy boron, tri-iso-butoxy boron, tri-n-butoxy boron, tri-sec-butoxy boron, tri-t-butoxy boron, tri-iso-propoxy gallium, tetramethoxy germanium, tetraethoxy germanium, tetra-iso-propoxy germanium, tetra-n-propoxy germanium, tetra-iso-butoxy germanium, tetra-n-butoxy germanium, tetra-sec-butoxy germanium and tetra-t-butoxy germanium; halogenated compound such as antimony pentachloride, zinc chloride, lithium bromide, tin(IV) chloride, cadmium chloride and boron trifluoride diethyl ether; alkyl aluminum such as trimethyl aluminum, triethyl aluminum, diethyl aluminum chloride, ethyl aluminum dichloride and tri-iso-butyl aluminum; alkyl zinc such as dimethyl zinc, diethyl zinc and diisopropyl zinc; tertiary amines such as triallylamine, triethylamine, tri-n-octylamine and benzyldimethylamine; heteropolyacids such as phosphotungstic acid, phosphomolybdic acid, silicotungstic acid and alkali metal salt thereof; zirconium compound such as zirconium acid chloride, zirconium octanoate, zirconium stearate and zirconium nitrate. Among these, zirconium octanoate, tetraalkoxy zirconium and trialkoxy aluminum compound are more preferable. Polymerization can be performed by method such as solution polymerization in inactive solvent such as benzene, toluene, xylene, cyclohexane, n-hexane, dioxane, chloroform and dichloroethane, and bulk polymerization.

Examples of cyclic ester used in method iv) include β-propiolactone, β-methyl-β-propiolactone, δ-valerolactone, ε-caprolactone, glycolide and lactide. Ring-opening polymerization of method iv) can be performed by method such as solution polymerization and bulk polymerization by use of well-known catalyst for ring-opening polymerization.

Among these methods for producing the aliphatic polyester (B), the ring-opening polymerization of cyclic acid anhydride and cyclic ether of method iii) is preferable because the method can produce the aliphatic polyester (B) in a comparatively short time with industrially good efficiency.

In case that the number-average molecular weight of polyester obtained by method i), ii), iii) or iv) is less than 10,000, the polyester can be transesterified or reacted with various chain-extending agents to high molecular weight polyester. Examples of chain-extending agent include isocyanate compounds, epoxy compounds, aziridine compounds, oxazoline compounds, polyvalent metal compounds, polyfunctional acid anhydrides, phosphoric acid esters and phosphorous acid esters. These may be used either alone respectively or in combinations with each other. The method for the reaction between the chain-extending agent and the polyester is not especially limited, but examples thereof include: a method comprising the steps of dissolving the polyester into an appropriate solvent and then causing the polyester to react with the chain-extending agent; and a method comprising the steps of heat-melting the polyester and then causing the polyester to react with the chain-extending agent.

As a production process for the present composition, a method that comprises kneading biodegradable polymer (A) when producing aliphatic polyester (B); a method that comprises kneading aliphatic polyester (B) when producing biodegradable polymer (A); and a method that comprises producing biodegradable polymer (A) and aliphatic polyester (B) separately and then kneading them together to carry out transesterification therebetween, can be applied. However, the method that comprises producing biodegradable polymer (A) and aliphatic polyester (B) separately and then kneading them together to carry out transesterification therebetween is desirable in order to avoid reacting biodegradable polymer (A) and aliphatic polyester (B) if possible and randomizing. Melt-kneading is preferable as the above kneading.

Kneading ratio (weight ratio) of biodegradable polymer (A) and aliphatic polyester (B) is in the range of preferably 1/99 to 99/1 and, in consideration of crystallization rate, tearing resistance and biodegradability, more preferably 5/95 to 70/30, still more preferably 10/90 to 50/50.

Well-known apparatuses can be used for obtaining the composition of the present invention.

Examples of tower type reaction apparatus include a reaction vessel comprising Herical ribbon wings and transformational spiral baffles.

Examples of sideways type reaction apparatus include a sideways type one- or twin-shaft kneader comprising agitation shafts which have a row of transformational wings and arranged in parallel to each other.

In addition, the reaction apparatus may be either a batch type or a continuous one. Examples of the batch type apparatus include Max Blend Type Reactor (made by Sumitomo Heavy Machine Co., Ltd.), Super Blend Type Reactor (made by Sumitomo Heavy Machine Co., Ltd.), ReverseCone Ribbon Wing Type Reactor (made by Mitsubishi Heavy Industries Co., Ltd.), Spiral Lattice-Shaped Wing Type Reactor (Hitachi Seisakusho Co., Ltd.). Examples of the continuous type apparatus include BIVOLAK (made by Sumitomo Heavy Machine Co., Ltd.), Hitachi Spectacles-Shaped Polymerization Machine (made by Hitachi Seisakusho Co., Ltd.), Hitachi Lattice-Shaped Polymerization Machine (made by Hitachi Seisakusho Co., Ltd.), Self-Cleaning Type Reactor (made by Mitsubishi Heavy Industries Co., Ltd.), Twin-Shaft Sideways Type Reactor (made by Mitsubishi Heavy Industries Co., Ltd.), KRC Kneader (made by Kurimoto Co., Ltd.), TEX-K (The Japan Steel Work Co., Ltd.) and single- or twin-screw extruders widely used for extrusion molding of plastics and devolatilization treatment.

The biodegradable polyester resin composition of the present invention has a number-average molecular weight of usually 5,000 to 200,000, preferably 10,000 to 100,000, more preferably 20,000 to 80,000.

Additives can be added to the biodegradable polyester resin composition of the present invention, if necessary. Examples of the additives include nucleating agents, pigments, dyes, heat-resisting agents, antioxidants, weather-resisting agents, lubricants, antistatic agents, stabilizers, fillers, strengthened materials, fire retardants, plasticizers and other polymers. The additives can be added in an amount that does not spoil an effect of the present invention.

The biodegradable polyester resin composition of the present invention exhibits not only a short tack-free time, but also good molding processability. Therefore, the biodegradable polyester resin composition can be applied to conventional molding method such as extrusion molding, injection molding, hollow molding and vacuum molding, and can be converted to molded product such as various parts, receptacles, materials, tools, films, sheets and fibers.

Effects and Advantages of the Invention

The biodegradable polyester resin composition, according to the present invention, exhibits a rapid crystallization rate and is easy to mold-process into materials excellent in biodegradability, such as fibers, molded products, films and sheets.

The molded product according to the present invention, obtained from the biodegradable polyester resin composition, is useful for materials such as fibers, molded products, films and sheets, and exhibits excellent biodegradability and good heat resistance, and further, excellent strength characters such as tearing strength, tensile strength and toughness.

Therefore, the biodegradable polyester resin-molded product, according to the present invention, can be effectively used for such as disposable wrapping materials, daily necessaries and general goods.

DETAILED DESCRIPTION OF THE PREFERRED EMBODIMENTS

Hereinafter, the present invention is more specifically illustrated by the following examples of some preferred embodiments in comparison with comparative examples not according to the invention. However, the present invention is not limited thereto. In addition, in the examples, the unit "part(s)" denotes "part(s) by weight". Evaluation methods performed in the examples are as follows. The results thereof were listed in Table 1.

(Molecular Weight)

The number-average molecular weight calculated in terms of polystyrene was measured with gel permeation chromatography (GPC).

(Melting Point)

Melting point was measured with DSC.

(Tack-free Time)

A film having 100 to 200 μm width was produced with a compressed molding apparatus in a condition of 130° C., 1470×104 Pa and two minutes. The obtained film was cut out to a sample of 2 cm×2 cm. This sample was placed in a cup made of aluminum and the cup made of aluminum was left in a oven of 130° C. for five minutes to melt the film. Then, this cup made of aluminum was placed on a hot plate of 40° C. and simultaneously a procedure of pressing the film with an edge of a spatula made of metal and releasing were repeated.

A time from the time when the cup made of aluminum was placed on the hot plate till the time when a depression on a surface of the film did not remain by pressing the film with the spatula, was measured. The time was defined as the tack-free time.

(Molecular-Weight-Retaining Ratio)

A film having 100 to 200 μm width was produced with a compressed molding apparatus in a condition of 130° C., 1470×104 Pa and two minutes. The obtained film was cut out to a sample of 2 cm×2 cm. This sample was placed on a hot plate of 150° C. in an isothermal and isohumid room of 23° C. and 65% (relative humidity). After four hours, the number-average molecular weight was measured with GPC and the molecular weight was substituted for formula (1), thus obtaining a molecular-weight-retaining ratio.

$$\text{Molecular-weight-retaining ratio} = X/Y \quad (1)$$

wherein: X represents a number-average molecular weight after a heating test in a condition of 150° C. and 4 hours; and Y represents a number-average molecular before the heating test.

(Tensile Test)

A film having 100 to 200 μm width was produced with a compressed molding apparatus in a condition of 130° C., 1470×104 Pa and two minutes. The obtained film was cut out to a test piece. Tensile fracture strength, tensile modules, fracture elongation and toughness were measured at a testing speed of 1,000 mm/minute.

(Biodegradable Test)

A film having 100 to 200 μm width was produced with a compressed molding apparatus in a condition of 130° C., 1470×104 Pa and two minutes. The obtained film was buried in a planter filled with soil and sprinkle water was added to the planter once a day. The planter was preserved in an isothermal and isohumid room of 65% (relative humidity) and external appearance change of the film was observed after one hundred days passed.

In addition, as the soil, soil mixture of collected soil at Onobara in Mino-shi and at Otabi-cho in Suita-shi and leaf mold in a ratio of 3:1:3 was used.

Results were mentioned as follow.

◯: not less than 10% of weight decrease

Δ: 3 to 10% of weight decrease

×: less than 3% of weight decrease

REFERENTIAL EXAMPLE 1

146.0 g of 1,4-butanediol, 218.8 g of adipic acid and 0.0016 g of tin octanoate (NIKKA OCTHIX "Tin": made by Nippon Chemical Industries Co., Ltd.) were reacted under nitrogen atmosphere in a temperature range of 230 to 240° C. After excluding almost water that produced in the reaction by distillation, 0.0003 g of tetrabutoxy titanium (monomer) was added to the reaction mixture. The reaction system was subjected to reduced pressure and excess of 1,4-butanediol was removed by distillation for one hour.

46.3 g of an obtained polymer, 103.7 g of dimethyl terephthalate, 103.7 g of 1,4-butanediol, 115.2 g of polyethylene glycol (molecular weight: 600, made by Wako Pure Chemicals Co., Ltd.) and 0.37 g of tetrabutoxy titanium (monomer) was added to a reaction vessel and heated to 180° C. gradually with stirring under nitrogen atmosphere. In the meantime of this treatment, methanol produced by transesterification was removed by distillation. The resultant mixture was heated at 230° C. for three hours under nitrogen atmosphere with raising stirring speed and 0.074 g of 50 weight % aqueous phosphoric acid was added further. Reaction pressure was reduced to 6.67×10$^5$ Pa for two hours and the pressure maintained less than 2.67×10$^5$ Pa and reaction temperature maintained 240° C. for one hour. On the one hand, excess of 1,4-butanediol was removed by distillation, thus obtaining prepolymer (1).

30.6 g of obtained prepolymer (1) was heated at 180° C. under nitrogen atmosphere. 0.23 g of hexamethylene diisocyanate was added with stirring and the resultant mixture was stirred for thirty minutes, thus obtaining biodegradable polymer (1).

REFERENTIAL EXAMPLE 2

15.3 g of prepolymer (1) obtained in Referential Example 1 was added to a 100 ml flask having flat bottom equipped with flat stirring apparatus, and the reaction system was maintained at $0.0133 \times 10^5$ Pa by a vacuum pump and heated. An oil bath was maintained at a temperature of 230° C. and was stirred for three hours. Next, the oil bath was maintained at a temperature of 200° C. and 0.26 g of hexamethylene diisocyanate was added. In addition, this mixture was stirred for thirty minutes, thus obtaining biodegradable polymer (2).

REFERENTIAL EXAMPLE 3

$32.5 \times 10^3$ parts by weight of succinic anhydride and 371.0 parts by weight of zirconium octanoate were added to a 100 ml reaction vessel made by SUS and atmosphere of the reaction vessel was replaced with nitrogen. Next, the reaction vessel made by SUS was heated gradually to 130° C. to melt succinic anhydride, and $16.5 \times 10^3$ parts by weight of ethylene oxide was added continuously at a rate of $3.14 \times 10^3$ parts by weight per one hour for 5.25 hours with maintaining the temperature and a pressure of the reaction vessel at $39.2 \times 10^4$ to $78.5 \times 10^4$ Pa. After adding ethylene oxide, a maturing reaction was performed at 130° C. for one hour, thus obtaining a polymerized product. A yield of the obtained polymerized product was 100.0%. In addition, the number-average molecular weight thereof was 2510 measured with GPC.

Continuously the obtained polymerized product was moved to another 100 ml reaction vessel made of SUS under nitrogen atmosphere, and 474.0 parts by weight of diphenyl phosphite was added. The above reaction mixture was reacted under a reduced pressure of $1.47 \times 10^5$ to $3.87 \times 10^5$ Pa for 1.7 hours in a condition: 60 rpm and a jacket temperature of 280° C., thus obtaining aliphatic polyester (1). The number-average molecular weight thereof was 54700 measured with GPC.

EXAMPLE 1

15.0 parts by weight of biodegradable polymer (1) obtained in Referential Example 1, 15.0 parts by weight of aliphatic polymer (1) obtained in Referential Example 3, 1.2 parts by weight of talc (LMP100, made by Maruo Calcium Co., Ltd.) as a nucleating agent, 0.15 parts by weight of lithium stearate as a surface-active agent and 0.15 parts by weight of pentaerythrityl-tetrakis[3-(3,5-di-t-butyl-4-hydroxyphenyl)propionate](IRGANOX 1010, made by Ciba-Geigy AG) were mixed with Laboplastmill (made by Toyo Seiki Seisakusyo Co., Ltd.) in a condition of: 30 rpm and a heated at a temperature of 130° C. for five minutes, thus obtaining biodegradable polyester resin composition (1).

EXAMPLE 2

Biodegradable polyester resin composition (2) was produced in the same way as of Example 1 except that biodegradable polymer (1) was replaced with biodegradable polymer (2).

EXAMPLE 3

Biodegradable polyester resin composition (3) was produced in the same way as of Example 1 except that amounts of biodegradable polymer (1) and aliphatic polyester (1) were changed into 1.2 g and 28.8 g respectively.

EXAMPLE 4

Biodegradable polyester resin composition (4) was produced in the same way as of Example 1 except that amounts of biodegradable polymer (1) and aliphatic polyester (1) were changed into 27.0 g and 3.0 g respectively.

EXAMPLE 5

Biodegradable polyester resin composition (5) was produced in the same way as of Example 1 except that amounts of biodegradable polymer (1) and aliphatic polyester (1) were changed into 22.5 g and 7.5 g respectively.

EXAMPLE 6

Biodegradable polyester resin composition (6) was produced in the same way as of Example 1 except that amounts of biodegradable polymer (1) and aliphatic polyester (1) were changed into 7.5 g and 22.5 g respectively.

Results of above Referential Examples and Examples were shown in Tables 1 and 2.

TABLE 1

| Sample measured | Example 1 Biodegradable polyester resin composition (1) | Example 2 Biodegradable polyester resin composition (2) | Example 3 Biodegradable polyester resin composition (3) | Example 4 Biodegradable polyester resin composition (4) |
|---|---|---|---|---|
| Biodegradable Polymer (A): Aliphatic polyester (B) (weight ratio) | 50:50 | 50:50 | 4:96 | 90:10 |
| Melting point (° C.) | 100 | 101 | 98 | 105 |
| Tack-free time (seconds) | 11 | 10 | 29 | 6 |
| Tensile fracture strength (N/cm$^2$) | 1,080 | 1,180 | 2,840 | 1,080 |
| Tensile Modulus (N/mm$^2$) | 153 | 206 | 291 | 105 |
| Fracture elongation (%) | 560 | 570 | 560 | 620 |
| Toughness (N/mm$^2$) | 110 | 99 | 132 | 80 |
| Molecular weight before heating | 42,000 | 45,000 | 52,000 | 38,000 |
| Molecular weight after heating | 39,000 | 42,000 | 45,000 | 35,000 |
| Molecular-weight-retaining ratio | 0.93 | 0.93 | 0.87 | 0.92 |
| Biodegration percentage (%) | 74 | 72 | 85 | 61 |

TABLE 2

| Sample measured | Example 5 Biodegradable polyester resin composition (5) | Example 6 Biodegradable polyester resin composition (6) | Referential Example 1 Biodegradable polymer (1) | Referential Example 3 Aliphatic polyester (1) |
|---|---|---|---|---|
| Biodegradable Polymer (A): Aliphatic polyester | 75:25 | 25:75 | 100:0 | 0:100 |

TABLE 2-continued

| Sample measured | Example 5 Biodegradable polyester resin composition (5) | Example 6 Biodegradable polyester resin composition (6) | Referential Example 1 Biodegradable polymer (1) | Referential Example 3 Aliphatic polyester (1) |
|---|---|---|---|---|
| (B) (weight ratio) | | | | |
| Melting point (° C.) | 100 | 99 | 115 | 97 |
| Tack-free time (seconds) | 19 | 26 | 2 | 40 |
| Tensile fracture strength (N/cm$^2$) | 1,180 | 1,760 | 1,670 | 3,430 |
| Tensile Modulus (N/mm$^2$) | 94 | 185 | 80 | 377 |
| Fracture elongation (%) | 490 | 520 | 710 | 550 |
| Toughness (N/mm$^2$) | 103 | 107 | 77 | 128 |
| Molecular weight before heating | 40,000 | 48,000 | 35,000 | 54,000 |
| Molecular weight after heating | 37,000 | 45,000 | 34,000 | 44,000 |
| Molecular-weight-retaining ratio | 0.93 | 0.94 | 0.97 | 0.81 |
| Biodegration percentage (%) | 70 | 78 | 45 | 90 |

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A biodegradable polyester resin composition, which comprises biodegradable polymer (A) and aliphatic polyester (B) wherein the biodegradable polymer (A) contains aromatic dicarboxylic acid as a structural unit and wherein the aliphatic polyester (B) is a polyester obtained from aliphatic dicarboxylic acid component having 2 to 6 carbon atoms and aliphatic glycol component having 2 to 4 carbon atoms, wherein said biodegradable polyester resin composition has an island-sea structure and is produced by the steps of:
    (a) synthesizing said biodegradable polymer (A) containing aromatic dicarboxylic acid as a structural unit;
    (b) synthesizing said aliphatic polyester (B); and
    (c) melt-kneading the resultant biodegradable polymer (A) and the resultant aliphatic polyester (B) together to form a biodegradable polyester resin composition, where said biodegradable polyester resin composition exhibits a biodegradation percentage of 60% or more as determined by the method of ISO14851, ISO14852, ISO14855 or OECD Guidelines for Testing of Chemicals (301C, Modified MITI Test).

2. A biodegradable polyester resin composition according to claim 1, wherein the weight ratio of the biodegradable polymer (A) and aliphatic polyester (B) is in the range of 1/99 to 99/1.

3. A biodegradable polyester resin composition according to claim 1, wherein the biodegradable polymer (A) is a polymer which comprises one or both of adipic acid or ester thereof and terephthalic acid or ester thereof as a structural unit.

4. A biodegradable polyester resin composition according to claim 1, wherein the number-average molecular weight of the biodegradable polymer (A) is in the range of 5,000 to 100,000.

5. A biodegradable polyester resin composition according to claim 1, wherein the number-average molecular weight of the aliphatic polyester (B) is in the range of 10,000 to 100,000.

6. A biodegradable polyester resin composition according to claim 1, wherein the number-average molecular weight of the biodegradable polyester resin composition is in the range of 5,000 to 200,000.

7. A biodegradable polyester resin composition according to claim 1, wherein the tack-free time of the composition is in the range of 3 to 30 seconds.

8. A biodegradable polyester resin composition according to claim 1, wherein the molecular-weight-retaining ratio defined in formula (1) shown below is 0.8 or more $$\text{Molecular-weight-retaining ratio} = X/Y \qquad (1)$$

wherein: X represents a number-average molecular weight after a heating test in a condition of 150° C. and 4 hours; and Y represents a number-average molecular before the heating test.

9. A molded product, which is obtained from the biodegradable polyester resin composition as recited in claim 1.

10. A molded product according to claim 9, wherein the toughness of the molded product is 49 N/mm$^2$ or more measured in 1,000 mm/minute of testing speed according to plastic tensile test (ASTM-D882-90 (A method)).

11. A process for producing a biodegradable polyester resin composition which exhibits a biodegradation percentage of 60% or more by the experiment according to the experimental method of either ISO14851, ISO14852, ISO14855 or OECD Guidelines for Testing of Chemicals (301C, Modified MITI Test), and where said biodegradable polyester composition has an island-sea structure, with the process comprising the following steps of:
    (a) synthesizing a biodegradable polymer (A) which contains an aromatic dicarboxylic acid as a structural unit;
    (b) synthesizing an aliphatic polyester (B) from an aliphatic dicarboxylic acid component having 2 to 6 carbon atoms and an aliphatic glycol component having 2 to 4 carbon atoms; and
    (c) melt-kneading the resultant biodegradable polymer (A) and the resultant aliphatic polyester (B) together to produce said biodegradable polyester resin composition.

12. A process for producing said biodegradable polyester resin composition according to claim 11, wherein the weight ratio of the biodegradable polymer (A) and aliphatic polyester (B) is in the range of 1/99 to 99/1.

13. A process for producing said biodegradable polyester resin composition according to claim 11, wherein the biodegradable polymer (A) is a polymer which comprises one or both of adipic acid or ester thereof and terephthalic acid or ester thereof as a structural unit.

14. A process for producing said biodegradable polyester resin composition according to claim 11, wherein the number-average molecular weight of the biodegradable polymer (A) is in the range of 5,000 to 100,000.

15. A process for producing said biodegradable polyester resin composition according to claim 11, wherein the number-average molecular weight of the aliphatic polyester (B) is in the range of 10,000 to 100,000.

16. A process for producing said biodegradable polyester resin composition according to claim 11, wherein the number-average molecular weight of the biodegradable polyester resin composition is in the range of 5,000 to 200,000.

17. A process for producing said biodegradable polyester resin composition according to claim 11, wherein the tack-free time of the composition is in the range of 3 to 30 seconds.

18. A process for producing said biodegradable polyester resin composition according to claim 11, wherein the molecular-weight-retaining ratio defined in formula (1) shown below is 0.8 or more $$\text{Molecular-weight-retaining ratio} = X/Y \qquad (1)$$

wherein: X represents a number-average molecular weight after a heating test in a condition of 150° C. and 4 hours; and Y represents a number-average molecular weight before the heating test.

19. A molded product, which is produced from a biodegradable polyester resin composition obtained by the process of claim 11.

20. A molded product according to claim 19, wherein the toughness of the molded product is 49 N/mm² or more measured in 1,000 mm/minute of testing speed according to plastic tensile test (ASTM-D882-90 (A method)).

* * * * *